(12) United States Patent
Maurel

(10) Patent No.: US 11,906,000 B2
(45) Date of Patent: Feb. 20, 2024

(54) MONOSTABLE COUPLING SYSTEM AND TORQUE TRANSMISSION DEVICE FOR A MOTOR VEHICLE

(71) Applicant: VALEO EMBRAYAGES, Amiens (FR)

(72) Inventor: Hervé Maurel, Cergy Pontoise (FR)

(73) Assignee: VALEO EMBRAYAGES, Amiens (FR)

( * ) Notice: Subject to any disclaimer, the term of this patent is extended or adjusted under 35 U.S.C. 154(b) by 0 days.

(21) Appl. No.: 17/782,806

(22) PCT Filed: Dec. 4, 2020

(86) PCT No.: PCT/EP2020/084602
§ 371 (c)(1),
(2) Date: Jun. 6, 2022

(87) PCT Pub. No.: WO2021/110898
PCT Pub. Date: Jun. 10, 2021

(65) Prior Publication Data
US 2023/0014230 A1    Jan. 19, 2023

(30) Foreign Application Priority Data

Dec. 6, 2019  (FR) ..................................... 19 13900
Dec. 6, 2019  (FR) ..................................... 19 13903

(51) Int. Cl.
F16D 23/06    (2006.01)

(52) U.S. Cl.
CPC ...... *F16D 23/06* (2013.01); *F16D 2023/0631* (2013.01); *F16D 2023/0656* (2013.01)

(58) Field of Classification Search
CPC ............. F16D 23/06; F16D 2023/0631; F16D 2023/0656
See application file for complete search history.

(56) References Cited

U.S. PATENT DOCUMENTS 4,238,012 A    12/1980  Takiguchi et al.
5,377,800 A *   1/1995  Sperduti ............... F16D 25/082
                                                  192/85.49
(Continued)

FOREIGN PATENT DOCUMENTS

JP    46-37362 Y1    12/1971
JP    52-39051 A      3/1977

OTHER PUBLICATIONS

International Search Report dated Dec. 23, 2020 in PCT/EP2020/084602, filed on Dec. 4, 2020, 2 pages.

*Primary Examiner* — David R Morris
(74) *Attorney, Agent, or Firm* — Oblon, McClelland, Maier & Neustadt, L.L.P.

(57) ABSTRACT

A coupling system for a torque transmission device of a motor vehicle includes a sliding sleeve. An actuator including a mobile member movable between a rest position and an activated position is linked to the sliding sleeve by a rotating kinematic link and by an elastic return member fixed in rotation about the axis of revolution. The mobile member is capable, by means of the kinematic link, of driving the sliding sleeve from the retracted position to the coupling position and of loading the elastic return member by passing from the rest position to the activated position. The elastic return member is able, while unloading, by means of the kinematic link, to return the mobile member from the activated position to the rest position and the sliding sleeve from the coupling position to the retracted position.

19 Claims, 7 Drawing Sheets

(56) References Cited

U.S. PATENT DOCUMENTS

| | | | | |
|---|---|---|---|---|
| 10,145,423 B2* | 12/2018 | Strömbom | ............... | F16D 11/10 |
| 10,502,270 B2* | 12/2019 | Yoshida | ................ | F16D 25/123 |
| 2004/0055850 A1* | 3/2004 | Howard | ................. | F16D 11/10 |
| | | | | 192/114 R |
| 2012/0168273 A1* | 7/2012 | Strombom | ............ | F16D 25/088 |
| | | | | 192/66.1 |
| 2018/0245641 A1* | 8/2018 | Yoshida | ................. | F16D 23/06 |

* cited by examiner

MONOSTABLE COUPLING SYSTEM AND TORQUE TRANSMISSION DEVICE FOR A MOTOR VEHICLE

TECHNICAL FIELD OF THE INVENTION

The invention relates to a coupling system intended more particularly, although not exclusively, to be integrated into a torque transmission device for an electric or hybrid vehicle, in particular for an electric or hybrid motor vehicle.

PRIOR ART

The invention applies more particularly to hybrid vehicles and to electric vehicles. The speed of an electric motor can be high, greater than or equal to 15,000 revolutions per minute for example, particularly for two-speed electric transmission lines.

To adjust the speed and the torque, the use of electric motors generally requires a transmission including a speed reduction device that makes it possible to achieve the desired speed and torque output levels at each wheel, and a differential to vary the speed between two laterally opposite wheels.

To adapt to the different vehicle speeds, it is known to use clutches that make it possible to select the desired reduction ratio on the speed reduction device. Such a device is disclosed in document DE102016202723, for example.

This device is unsatisfactory in terms of efficiency, as drag torque occurs on one of the clutches, which is open when the other clutch is closed. This drag torque is particularly detrimental when the clutches are wet.

In addition, the clutches of this device transmit relatively high torque, which means that the clutches must be a considerable size and weight, and therefore results in a large footprint linked to the clutches.

Application FR1901916, as yet unpublished, proposes a torque transmission device for a vehicle comprising at least one motor, the torque transmission device comprising:
- a first clutch comprising a first input element capable of being driven by the motor, and a first output element, torque being transmitted between the first input element and the first output element when the first clutch is closed,
- a second clutch comprising a second input element capable of being driven by the motor, and a second output element, torque being transmitted between the second input element and the second output element when the second clutch is closed, a transmission member,
- a first transmission mechanism arranged to transmit torque between the first output element and the transmission member, according to a first gear ratio,
- a second transmission mechanism arranged to transmit torque between the second output element and the transmission member, according to a second gear ratio different from the first gear ratio, and
- a connection element arranged to permit or interrupt the mutual rotational drive between the first output element of the first clutch and the transmission member, by means of the first transmission mechanism.

The use of at least two gear ratios makes it possible to reconcile high starting torque and maximum speed and consequently to reduce the time necessary for the vehicle to reach a high speed. The choice of two gear ratios with an electric motor offers a good compromise between the complexity of the transmission, the dynamic performance, the consumption of the vehicle, and the size of the electric motor.

The use of the clutches, particularly progressive multi-disk clutches, also makes it possible to ensure user comfort by avoiding sudden gear changes, together with perceptible changes in acceleration.

In addition, the connection element makes it possible to interrupt the driving of the output element of the first clutch, and particularly the output friction disks of the first clutch, when the second clutch is closed, which makes it possible to improve the energy efficiency by significantly limiting, or even eliminating, the drag torque in the first clutch when the second clutch is closed.

However, the integration of a connection element requires a compact and efficient actuator.

SUMMARY OF THE INVENTION

The invention aims to overcome the drawbacks of the state of the art and to propose.

To do this there is proposed, according to a first aspect of the invention, a coupling system comprising:
- a first engagement interface able to rotate about an axis of revolution in a fixed frame of reference, and a second engagement interface able to rotate about the axis of revolution in the fixed frame of reference and relative to the first engagement interface;
- a sliding sleeve including an intermediate engagement interface engaged with one of the first and second engagement interfaces, the sliding sleeve being capable of moving, by translation parallel to the axis of revolution, from a retracted position in which the intermediate engagement interface is not engaged with the other of the first and second engagement interfaces to a coupling position in which the intermediate engagement interface is engaged with one and the other of the first and second engagement interfaces and produces a rotational coupling between the first engagement interface and the second engagement interface;
- an actuator comprising a fixed support in the fixed frame of reference and a mobile member, the mobile member being movable in translation parallel to the axis of revolution between a rest position and an activated position; and
- a rotating kinematic link between the mobile member and the sliding sleeve, having a degree of freedom of rotation about the axis of revolution.

According to the invention, the actuator comprises an elastic return member fixed in rotation about the axis of revolution in the fixed frame of reference, the mobile member being capable, by means of the kinematic link, of driving the sliding sleeve from the retracted position to the coupling position and of loading the elastic return member by passing from the rest position to the activated position, the elastic return member being able, while unloading, to return, by means of the kinematic link, the mobile member from the activated position to the rest position and the sliding sleeve from the coupling position to the retracted position.

The elastic return member gives the dog clutch produced by the three engagement interfaces a "normally open" coupling function. The implementation of a monostable actuator makes it possible to have a compact and simplified actuator. The elastic return member does not form part of the rotating unit that must be accelerated on each coupling, which limits the transient torque of the coupling system during the coupling phases. The mobile member of the actuator is itself preferably also fixed in rotation about the axis of revolution, so that it does not contribute either to the moment of inertia of the rotating masses.

In practice, the first engagement interface and the second engagement interface are made up of splines with an identical pitch, in which teeth of the intermediate engagement interface slide axially. A person skilled in the art will, however, understand that more generally a single tooth or spline is sufficient on the intermediate engagement interface, which can slide in a single spline or on a single tooth of the first engagement interface and the second engagement interface.

The elastic return member may consist of one or more springs, particularly of helical springs the axes of which are parallel to the axis of revolution and separate from the axis of revolution, evenly distributed about the axis of revolution.

According to one embodiment, the second engagement interface is arranged in the axial extension of the first engagement interface. The teeth of the splines of the first and second engagement interfaces extend axially.

According to one embodiment, the mobile member is fixed in rotation about the axis of revolution in the fixed frame of reference.

According to one embodiment, one end of the elastic return member bears against a support secured to the fixed support. In practice and preferably, provision is made for the fixed support to comprise a body having a front face facing axially toward the second engagement interface, and rods project axially from this front face, each rod comprising a head on which the support is formed, the elastic return member comprising springs gripped axially between the heads and the kinematic link.

According to one embodiment, the rods have a threaded end which is screwed into an internal thread of the body of the fixed support. The springs can be mounted around the rods.

According to one embodiment, the kinematic link comprises an intermediate push rod between the mobile member and the elastic return member.

The push rod is fixed in rotation about the axis of revolution.

The push rod bears axially against the mobile member and against the elastic return member.

The push rod is linked to the sliding sleeve by a rotational guide or a pivot connection about the axis of revolution.

Where appropriate, the push rod comprises a collar against which the springs bear, in which collar are formed openings, the rods passing through these openings so that the rods axially guide the push rod.

According to a particularly simple embodiment, the rotational guide provides a pivot connection about the axis of revolution 100, with or without axial play.

It may be, for example, a pivot connection constituted by a ball bearing with bidirectional axial force absorption.

Alternatively, the rotating kinematic link has a dimensional constructive translational play parallel to the axis of revolution between the sliding sleeve and the rotational guide (or the pivot connection), this play having an amplitude greater than one hundredth and less than one tenth of the stroke between the rest position and the activated position. The play then makes it possible to envision that the parts producing the rotational guidance or the pivot connection, in particular the push rod, are not in motion in the stable positions of the system, which further reduces the drag torque.

According to a particularly advantageous embodiment, the rotational guide or the pivot connection comprises at least one annular pad, the annular pad being positioned at least partially between two opposite walls of the sliding sleeve, which are preferably annular.

According to one embodiment, the two opposite walls of the sliding sleeve can be formed on an annular radial rib of the sliding sleeve, which enters an annular groove of the pad.

Alternatively, and preferably, the opposite walls of the sliding sleeve can be made up of opposite sides of an annular groove formed in the sliding sleeve, and in which the pad is at least partially engaged.

Preferably, the annular pad is positioned at least partially between two opposite walls of the push rod, which are preferably annular.

According to one embodiment, the two opposite walls of the push rod are formed on an annular radial rib of the push rod, which enters an annular groove of the pad.

Alternatively, and according to a preferred embodiment, the opposite walls of the push rod can be made up of opposite sides of an annular groove formed in the push rod, and in which the pad is at least partially engaged.

The annular pad can be made of plastics material with a low coefficient of friction, if necessary of a material filled with solid lubricant. Preferably, play is preserved axially between the annular pad and the opposite walls of the annular groove of the sliding sleeve. Alternatively, or additionally, play can be preserved axially between the annular pad and the opposite walls of the annular groove of the push rod.

The actuator can be electromechanical, where appropriate. Alternatively, and preferably, the mobile member comprises an annular piston capable of sliding axially in a variable-volume annular chamber of the fixed support, connected to a hydraulic supply line. The hydraulic drive ensures great compactness at a very low cost. The hydraulic cylinder formed by the piston sliding in the annular chamber is one-way, and the return to the rest position is ensured by the elastic return member.

According to one embodiment, there is interposed axially between the first engagement interface and the second engagement interface a synchronizer including at least one synchronizing ring, the sliding sleeve in the retracted position not driving the synchronizing ring, the sliding sleeve being capable, when moving during an axial translation from the retracted position to the coupling position, of passing through an intermediate synchronizing position in which the intermediate engagement interface is engaged in a synchronizing engagement interface of the synchronizing ring and produces a rotational coupling between the first engagement interface and the synchronizing ring, the synchronizing ring being capable of rotating relative to the second engagement interface about the axis of revolution, generating, by friction, torque for driving the second engagement interface. The synchronizer allows the progressive setting in motion of the second engagement interface in the transitional coupling phase, which avoids torque spikes and excessive impacts between the intermediate engagement interface and the other of the first and second engagement interfaces.

According to one embodiment, the push rod comprises two adjacent covers defining the annular groove in which the pad is held axially clamped.

In practice, the coupling system comprises:
  a transmission shaft capable of rotating about the axis of revolution, the first engagement interface being secured to the transmission shaft, and an idle transmission wheel capable of rotating relative to the transmission shaft about the axis of revolution, the second engagement interface being secured to the idle transmission wheel.

According to another aspect of the invention, the latter relates to a torque transmission device for a motor vehicle comprising at least one motor, the transmission device comprising:
- a first input element and a second input element,
- a coupling system as described above,
- a first transmission mechanism, arranged to permanently transmit to the idle transmission wheel a rotational movement of the first input element, according to a first constant gear ratio,
- a second transmission mechanism arranged to permanently transmit a rotational movement between the second input element and the transmission shaft, according to a second constant gear ratio different from the first gear ratio.

Such a transmission device can be applied in particular to hybrid vehicles and to electric vehicles, characterized by high revolution speeds of the rotor of the electric motor, greater than or equal to 15000 revolutions per minute, for example. As discussed above, the use of at least two gear ratios makes it possible to reconcile high starting torque and maximum speed.

In practice, the first gear ratio is intended to be used only during short transitional phases of starting or running at walking speed, the second ratio being intended for its part to provide traction in all other circumstances.

Preferably, the torque transmission device further comprises at least one clutch capable, in a closed state, of transmitting torque between the drive shaft and the second input element.

According to one embodiment, the torque transmission device further comprises another clutch capable, in a closed state, of transmitting torque between a drive shaft of the motor and the first input element and, preferably, a control for controlling the actuator so that the mobile member is in the coupling position when the other clutch is closed, and that the mobile member is in the rest position when the other clutch is open.

Alternatively, the transmission between the drive shaft and the first input element is direct, and the coupling function is performed solely by the coupling system.

These arrangements make it possible to ensure good energy efficiency by avoiding driving the components of the first clutch and of the coupling system when the second clutch is closed.

The invention also relates to a coupling system comprising:
- a first engagement interface able to rotate about an axis of revolution in a fixed frame of reference, and a second engagement interface able to rotate about the axis of revolution in the fixed frame of reference and relative to the first engagement interface;
- a sliding sleeve including an intermediate engagement interface engaged with one of the first and second engagement interfaces, the sliding sleeve being capable of moving, by translation parallel to the axis of revolution, from a retracted position in which the intermediate engagement interface is not engaged with the other of the first and second engagement interfaces to a coupling position in which the intermediate engagement interface is engaged with the other of the first and second engagement interfaces and produces a rotational coupling between the first engagement interface and the second engagement interface;
- an actuator comprising a fixed support and a mobile member, the mobile member being movable in translation parallel to the axis of revolution between a rest position and an activated position; and a rotating kinematic link between the mobile member and the sliding sleeve, having a degree of freedom of rotation about the axis of revolution.

According to this invention, the kinematic link comprises a push rod fixed in rotation about the axis of revolution in the fixed frame of reference, and an annular pad, the annular pad being capable of cooperating axially with two opposite walls of the push rod so that an axial translational movement of the push rod can be transferred to the annular pad in two opposite directions parallel to the axis of revolution, and the annular pad being capable of cooperating axially with two opposite walls of the sliding sleeve so that an axial translational movement of the annular pad can be transferred to the sliding sleeve in the two opposite directions, the annular pad being free to rotate about the axis of revolution relative to the sliding sleeve; so that when the mobile member passes from the rest position to the activated position, the annular pad bears against one of the opposite faces of the push rod and one of the opposite faces of the sliding sleeve and drives the sliding sleeve from the retracted position to the coupling position.

In practice, the first engagement interface and the second engagement interface are made up of annular splines with an identical pitch, in which teeth of the intermediate engagement interface slide axially. A person skilled in the art will, however, understand that more generally a single tooth or spline is sufficient on the intermediate engagement interface, which can slide in a single spline or on a single tooth of the first engagement interface and the second engagement interface.

The structure of the rotating kinematic link makes it possible to very simply provide the function of transmission of the translational movements without transmission of the rotational movements about the axis of revolution.

According to a particularly advantageous embodiment, a dimensional constructive translational play parallel to the axis of revolution, having an amplitude greater than one hundredth and less than one tenth of the stroke between the rest position and the activated position, is preserved axially between the annular pad and the opposite walls of the sliding sleeve. This play makes it possible to limit the interaction between the pad and the opposite faces of the sliding sleeve in the transitional phases of movement between the retracted position and the coupling position. In the retracted position as in the coupling position, the sliding sleeve finds a fixed positioning in translation and is positioned in a position such that the pad is at a distance from the two opposite faces of the sliding sleeve. The residual drag torque induced by the rotating kinematic link is thus greatly reduced. This self-centering of the pad is facilitated by the fact that the parts are in an oil bath, and that a film of oil is formed between the pad and the opposite faces of the sliding sleeve.

According to one embodiment, the two opposite walls of the push rod are formed on an annular radial rib of the push rod, which enters an annular groove of the pad. Alternatively, and according to a preferred embodiment, the two opposite walls of the push rod are formed on the sides of an annular groove of the push rod.

Similarly, the two opposite walls of the sliding sleeve can be formed on an annular radial rib of the sliding sleeve, which enters an annular groove of the pad. Alternatively, and preferably, provision can be made for the two opposite walls of the sliding sleeve to be formed on the sides of an annular groove of the sliding sleeve.

According to one embodiment, the annular pad has a substantially square or rectangular axial cross section.

According to one embodiment, the push rod and the mobile member constitute a monoblock unit, and may be made up of one piece or secured to one another. According to another embodiment, the two parts are separate and the push rod bears against the mobile member.

According to one embodiment, the mobile member comprises an annular piston able to slide axially in a variable-volume annular chamber of the fixed support, connected to a hydraulic supply line. The actuator may, where appropriate, be entirely annular, which allows it to be crossed right through by a transmission shaft of a torque transmission device in which the coupling system according to the invention is integrated. Alternatively, the actuator may delimit a cavity closed by a bottom, to house one end of a transmission shaft of a torque transmission device. In both cases, it is possible to take advantage of the annular shape of the fixed support of the actuator to house in the cavity a plain or rolling bearing for guiding the transmission shaft in rotation.

According to one embodiment, the coupling system comprises an elastic return member fixed in rotation about the axis of revolution, the mobile member being able, via the push rod, to load the elastic return member by passing from the rest position to the activated position, the elastic return member being able, by unloading, by means of the push rod, to return the mobile member from the activated position to the rest position and the sliding sleeve from the coupling position to the retracted position.

Preferably, one end of the elastic return member bears against a support secured to the fixed support.

The elastic member of the actuator gives the dog clutch produced by the three engagement interfaces a "normally open" coupling function. The elastic return member does not form part of the rotating unit that must be accelerated on each coupling, which limits the transient torque of the coupling system during the coupling phases. The mobile member of the actuator is itself preferably also fixed in rotation about the axis of revolution, so that it does not contribute either to the moment of inertia of the rotating masses.

The elastic return member may consist of one or more springs, particularly of helical springs the axes of which are parallel to the axis of revolution and separate from the axis of revolution, evenly distributed about the axis of revolution.

According to one embodiment, the coupling system includes, interposed axially between the first engagement interface and the second engagement interface, a synchronizer including at least one synchronizing ring, the sliding sleeve in the retracted position not driving the synchronizing ring, the sliding sleeve being capable, when moving during an axial translation from the retracted position to the coupling position, of passing through an intermediate synchronizing position in which the intermediate engagement interface is engaged in a synchronizing engagement interface of the synchronizing ring and produces a rotational coupling between the first engagement interface and the synchronizing ring, the synchronizing ring being capable of rotating relative to the second engagement interface about the axis of revolution, generating, by friction, torque for driving the second engagement interface. The synchronizer allows the progressive setting in motion of the second engagement interface in the transitional coupling phase, which avoids torque spikes and excessive impacts between the intermediate engagement interface and the other of the first and second engagement interfaces.

In practice, the coupling system comprises:
a transmission shaft capable of rotating about the axis of revolution, the first engagement interface being secured to the transmission shaft, and an idle transmission wheel capable of rotating relative to the transmission shaft about the axis of revolution, the second engagement interface being secured to the idle transmission wheel.

According to another aspect of the invention, the latter relates to a torque transmission device for a motor vehicle comprising at least one motor, the transmission device comprising:
  a first input element and a second input element,
  a coupling system as described above,
  a first transmission mechanism, arranged to permanently transmit to the idle transmission wheel a rotational movement of the first input element, according to a first constant gear ratio,
  a second transmission mechanism arranged to permanently transmit a rotational movement between the second input element and the transmission shaft, according to a second constant gear ratio different from the first gear ratio.

Such a transmission device can be applied in particular to hybrid vehicles and to electric vehicles, characterized by high revolution speeds of the rotor of the electric motor, greater than or equal to 15000 revolutions per minute, for example. As discussed above, the use of at least two gear ratios makes it possible to reconcile high starting torque and maximum speed.

In practice, the first gear ratio is intended to be used only during short transitional phases of starting or running at walking speed, the second ratio being intended for its part to provide traction in all other circumstances.

Preferably, the torque transmission device further comprises at least one clutch capable, in a closed state, of transmitting torque between the drive shaft and the second input element.

According to one embodiment, the torque transmission device further comprises another clutch capable, in a closed state, of transmitting torque between a drive shaft of the motor and the first input element and, preferably, a control for controlling the actuator so that the mobile member is in the coupling position when the other clutch is closed, and that the mobile member is in the rest position when the other clutch is open.

Alternatively, the transmission between the drive shaft and the first input element is direct, and the coupling function is performed solely by the coupling system.

These arrangements make it possible to ensure good energy efficiency by avoiding driving the components of the first clutch and of the coupling system when the second clutch is closed.

BRIEF DESCRIPTION OF THE FIGURES

Further features and advantages of the invention will become apparent from reading the following description, with reference to the attached figures, in which.

For greater clarity, identical or similar elements are identified using identical reference signs in all of the figures.

DETAILED DESCRIPTION OF EMBODIMENTS

In the description and the claims, the terms "external" and "internal" and the orientations "axial" and "radial" will be used to denote elements of the transmission device according to the definitions given in the description. By convention, the "radial" orientation is orthogonal to the axial orientation. The axial orientation relates, depending on the context, to the axis of rotation of one of the shafts, for example the output shaft of the motor or the transmission shaft 5. The "circumferential" orientation is orthogonal to the axial direction and orthogonal to the radial direction. The terms "external" and "internal" are used to define the relative position of one element with respect to another, with respect to the reference axis, an element close to the axis thus being described as internal as opposed to an external element situated radially at the periphery.

The different members of the transmission device each have a torque input also called an input element, and a torque output also called an output element. The input is situated, from a kinematic point of view, on the motor side, and the output is situated on the side of the wheels of the vehicle.

Figure 1:
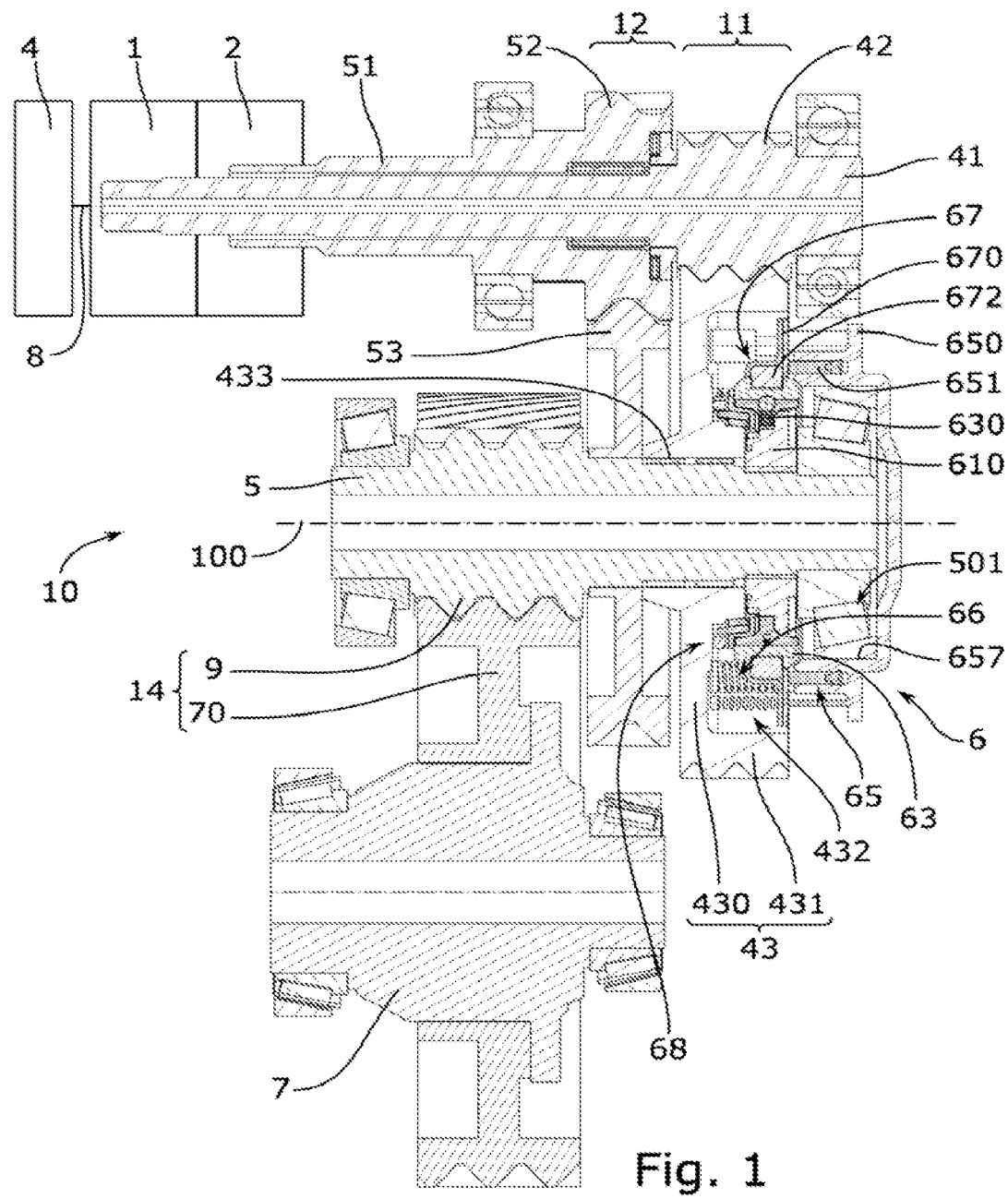
FIG. 1 is a cross-sectional view along the lines I-I in FIG. 4 of a torque transmission system incorporating a coupling system according to one embodiment of the invention, in a retracted position of the coupling system.

FIG. 1 illustrates a torque transmission system comprising an electric motor 4 of a motor vehicle capable of propelling the vehicle, and a torque transmission assembly.

The torque transmission assembly includes a transmission device 10 and a differential 7 capable of driving two laterally opposite wheels, or two sets of driven front and rear wheels of the vehicle. The torque transmission device 10 comprises an output member 9 coupled to the differential 7.

As previously described in prior application FR1901916, the torque transmission device 10 includes:

a first clutch 1 comprising a first input element capable of being driven by the motor 4, and a first output element, torque being transmitted between the first input element and the first output element when the first clutch is closed, a second clutch 2 comprising a second input element capable of being driven by the motor, and a second output element, torque being transmitted between the second input element and the second output element when the second clutch is closed, a transmission member 5, which in this case is a transmission shaft, a first transmission mechanism 11 arranged to transmit torque between the first output element and the transmission member 5, according to a first gear ratio, a second transmission mechanism 12 arranged to transmit torque between the second output element and the transmission member 5, according to a second gear ratio different from the first gear ratio, a coupling system 6 arranged to permit or interrupt the mutual rotational drive between the first output element of the first clutch 1 and the transmission member 5, by means of the first transmission mechanism 11.

Gear ratio is given to mean the ratio between the speed at the output of the transmission mechanism and the speed at the input of the transmission mechanism.

The first input element of the first clutch 1 and the second input element of the second clutch 2 are arranged to be driven by a common torque input shaft 8, which in this case is the output shaft of the motor 4. The clutches 1 and 2 are kinematically placed as close as possible to the motor 4, before the reduction devices, which means that the two clutches are placed in a portion of the transmission line where the torque is lowest. In the case of progressive friction clutches particularly, this arrangement allows improved compactness of the clutches. Preferably, the first clutch 1 is a progressive friction clutch and the second clutch 2 is a progressive friction clutch. The gear changes can thus be smooth and progressive without sudden accelerations. Progressive clutch is given to mean a clutch the transmissible torque of which can be controlled progressively. Where appropriate, the first clutch 1 and the second clutch 2 can jointly form a dual clutch.

To increase the torque and reduce the rotating speed at the output of the torque transmission device, a speed reducer 14 is formed in this case by the output member 9 and the differential 7 by means of a pinion forming the output member 9 meshing with a toothed wheel 70 arranged at the input of the differential 7.

The coupling system 6 is arranged to permit the mutual rotational drive between the first output element of the first clutch 1 and the transmission shaft 5, by means of the first transmission mechanism 11, when the first clutch 1 is closed, and to interrupt the mutual rotational drive between the first output element of the first clutch 1 and the transmission member 5, by means of the first transmission mechanism 11, when the first clutch is open and the second clutch is closed.

The coupling system is arranged so that it permits or interrupts the mutual drive directly between the transmission shaft 5 and the first transmission mechanism 11. By avoiding driving the first transmission mechanism unnecessarily, detrimental losses of efficiency are avoided in the first transmission mechanism, which losses could be linked in particular to the splash lubrication of the rotating transmission elements.

The first transmission mechanism 11 is a speed-reduction gear train. The second transmission mechanism 12 is also a speed-reduction gear train. These gear trains can be mounted so that they are splash lubricated by the oil. The first transmission mechanism 11 has a lower gear ratio than the second transmission mechanism 12. The first transmission mechanism is used to propel the vehicle at relatively low speeds, and the second transmission mechanism is used to propel the vehicle at relatively high speeds.

The first transmission mechanism 11 comprises a first input shaft 41 rigidly connected to a first toothed input wheel 42 or pinion 42 for rotation therewith, a toothed output wheel 43 meshing in this case directly with the first toothed input wheel 42.

The second transmission mechanism 12 comprises a second input shaft 51 rigidly connected to a second toothed input wheel 52 or pinion 52 for rotation therewith, a second toothed output wheel 53 meshing in this case directly with the second toothed input wheel 52.

The second input shaft is a hollow shaft 51 and the first input shaft 41 extends inside this hollow shaft 51. The second input shaft 51 and the first input shaft 41 are coaxial.

The pinion 42 can be mounted on or integrally formed with the first input shaft 41. Similarly, the pinion 52 can be mounted on or integrally formed with the second input shaft 51.

The second toothed output wheel 53 is rigidly connected to the transmission shaft 5 for rotation therewith, for example via splines. The first toothed output wheel 43 is an idle wheel that rotates about the axis of revolution 100 of the transmission shaft 5, but can be rigidly connected to the transmission shaft 5 for rotation therewith by means of the coupling system 6. A needle bearing 433 guides the rotation of the first toothed output wheel 43 on a cylindrical face of the transmission shaft 5.

Figure 3:
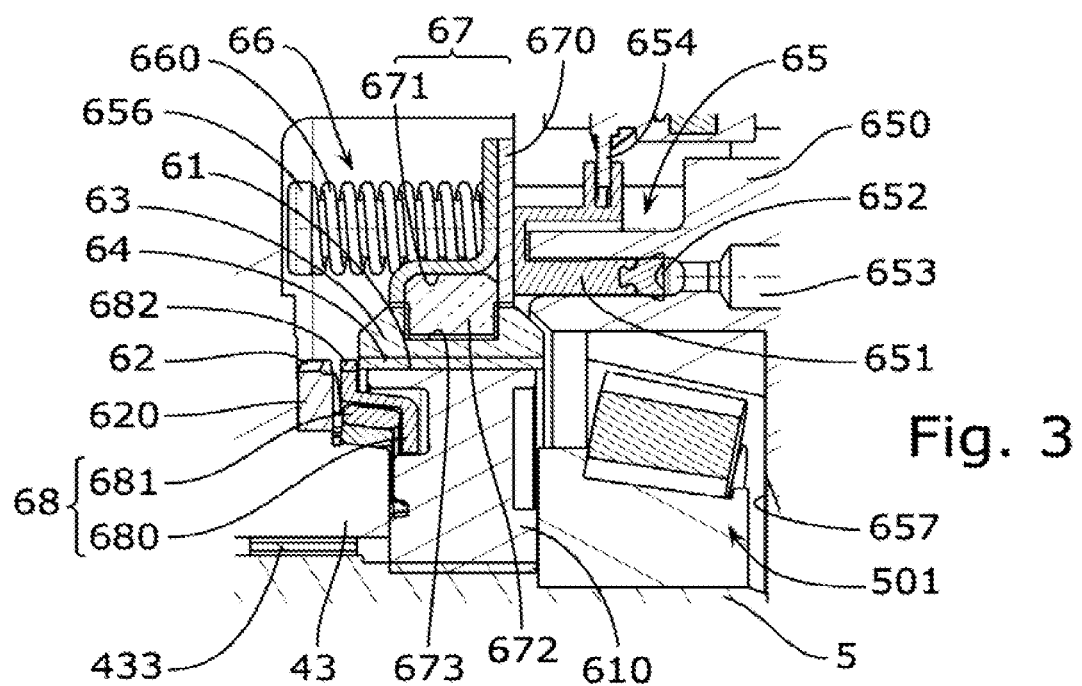
FIG. 3 shows a detail of FIG. 2.
Figure 7:
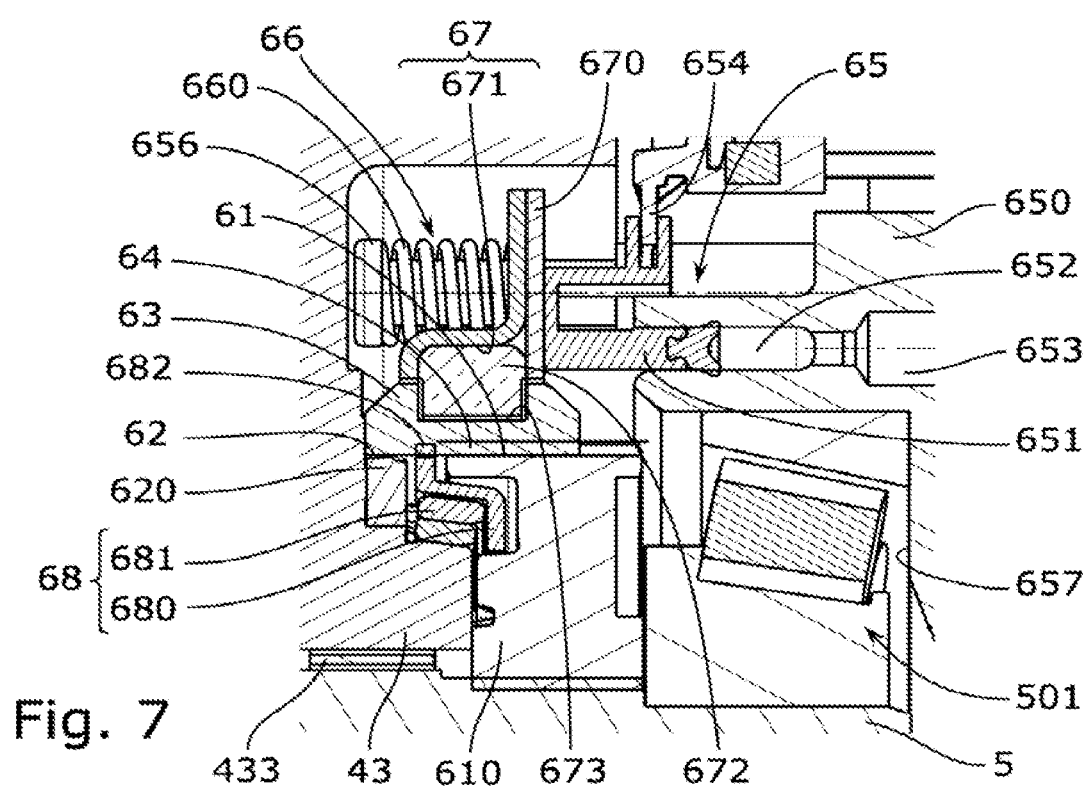
FIG. 7 shows a detail of FIG. 6.

The coupling system 6, illustrated in detail in FIGS. 3 and 7, includes a first engagement interface 61 made up in this case of a first spline formed on the periphery of a wheel 610 shrink-fitted or rigidly connected by splines on the transmission shaft 5, a second engagement interface 62 made up of a second spline formed on the periphery of a ring 620 shrink-fitted on the first toothed output wheel 43 and a sliding sleeve 63 including an intermediate engagement interface 64 formed by an intermediate spline arranged to interact with the first spline 61 and the second spline 62.

More specifically, the splines 61, 62, 64 are made up of grooves separated by ribs or teeth, which extend axially parallel to the axis of revolution 100. The teeth of the intermediate spline 64 are in this case facing radially inward to enter the corresponding grooves of the first spline 61 and the second spline 62. The intermediate spline 64 is permanently engaged with the first spline 61. The sliding sleeve 63 that bears the intermediate spline 64 is capable of moving, by translation parallel to the axis of revolution 100, from a retracted position illustrated in FIGS. 1 to 3, in which the intermediate spline 64 is not engaged with the second spline 62, to a coupling position in which the intermediate spline is engaged with the second spline and produces a rotational coupling between the first spline and the second spline, and by this means between the first toothed output wheel 43 and the transmission shaft 5.

Optionally, an elastic retaining member 630 is arranged between the wheel 610 and the sliding sleeve 63 to hold the sliding sleeve 63 in the retracted position provided that an axial force greater than a predetermined threshold is not exerted on the sliding sleeve 63 by the piston 651.

The coupling system 6 further includes an actuator 65 including a fixed support 650 and a mobile member 651 made up of an annular piston capable of sliding axially in a variable-volume annular chamber 652 of the fixed support 650, this annular chamber 652 being connected to a hydraulic supply line 653. Optionally, a sensor 654 makes it possible to detect the position of the mobile member 651.

The hydraulic cylinder formed by the annular piston 651 sliding in the annular chamber 652 is one-way and makes it possible to drive the sliding sleeve 63 from the retracted position to the coupling position.

An elastic return member 66, in this case made up of helical springs 660 aligned on axes parallel to the axis of revolution 100 and distributed about the axis of revolution 100, in turn returns the sliding sleeve from the coupling position to the retracted position. The elastic return member 66 is positioned in opposition to the piston 651, so that it is loaded when the pressure in the annular chamber 652 forces the piston 651 to push the sliding sleeve 63 from the retracted position to the coupling position, and unloaded by pushing the piston 651 back to the retracted position when the pressure is released in the chamber 652.

A kinematic link 67 is interposed between the sliding sleeve 63 and the actuator 65 and its elastic return member 66. The kinematic link includes a push rod 670 forming a control groove 671, between two opposite walls of which is gripped a radially outer portion of an annular pad 672, a radially inner portion of which is accommodated with axial play between two opposite walls of a groove 673 of the sliding sleeve 63.

Rods 655 (FIG. 2) securely screwed into the body of the fixed support 650 pass through openings formed in the push rod 670 in line with the springs 660 of the elastic return member 66, also pass through the springs 660, and each include a head 656 acting as a stop for one end of the associated spring 660. The springs 660 are thus gripped between the heads 656 of the rods 655 and the push rod 670.

The push rod 670, gripped between the piston 651 and the elastic return member 66, is guided in translation by the rods 655 so that it does not rotate about the axis of revolution 100. Thus, the mobile unit made up of the push rod 670, the elastic return member 66 and the piston 651 is mobile in axial translation, without rotation about the axis of revolution 100. The push rod 670 can be made in one piece or, as can be seen in FIG. 3, made up of two adjacent sheets pressed against each other and defining the groove 671.

The pad 672, gripped in the groove 671 of the push rod 670 and positioned in the groove 673 of the sliding sleeve 63, provides a rotational guide or a pivot connection between the push rod 670 and the sliding sleeve 63, which makes it possible to transmit the translational movements of the push rod 670 to the sliding sleeve 63 but without preventing free rotation of the sliding sleeve 63 about the axis of revolution 100 relative to the push rod 670. The translational movements are carried out when the push rod 670, moving axially under the impetus of the piston 651 or the elastic return member 66, pushes the pad 672 against one of the opposite side walls of the groove 673 and forces the pad 672 to push the sliding sleeve 63 axially in the same direction as the push rod 670. The pad 672 is made up of a material with a low coefficient of friction, ideally impregnated with solid lubricant, for minimum friction with the side walls of the groove 673.

The axial play arranged between the pad 672 and the opposite walls of the annular groove 673 must be small relative to the total stroke of the push rod between the retracted position and the coupling position. In practice, this play has an amplitude smaller than one tenth of the stroke between the rest position and the activated position. This play makes it possible, once the push rod 670 has reached the coupling position, to virtually eliminate any pressure, or even any contact, between the pad 672 and the walls of the groove 673, insofar as the coupling between the splines 61, 62 and 64 does not generate, once produced, any significant axial force. The pad 672 does not thus exert any significant drag torque against the rotation of the first toothed output wheel 43.

The coupling system 6 further includes, interposed axially between the first engagement interface 61 and the second engagement interface 62, a synchronizer 68 including at least one synchronizing ring 680 free to rotate about the axis of revolution 100 and, if appropriate, one or more intermediate friction rings 681 between the synchronizing ring 680 and the first toothed output wheel 43. The synchronizing ring 680 has at least one axial tooth or groove 682 forming a synchronizing engagement interface.

The sliding sleeve 63 in the retracted position has no interaction with the synchronizing ring 680. When the sliding sleeve starts its axial translational movement from the retracted position toward the coupling position, it passes through an intermediate synchronizing position in which the intermediate spline 64 and the synchronizing engagement interface 681 of the synchronizing ring 680 engage in each other and produce a rotational coupling between the first engagement interface 61 and the synchronizing ring 680. If the wheel 610 bearing the first spline 61 engaged with the intermediate spline 64 of the sliding sleeve 63 is rotated by the intermediate shaft 5, when the first toothed output wheel 43 is not moving, the friction generated between the synchronizing ring 680 and the toothed output wheel 43, directly or by means of the friction rings 681, sets in motion the toothed output wheel, while the sliding sleeve 63 continues its stroke toward the coupling position. When the intermediate spline 64 comes into contact with the second spline 62, the speed difference between the toothed wheel 43 bearing the second spline 62 and the intermediate spline 64 of the sliding sleeve 63 is small, so that the engagement between the intermediate spline 64 and the second spline 62 can take place without impacts and without noise.

The first toothed output wheel 43 includes a wheel disk 430 and a peripheral drum 431 on which are formed the teeth that mesh with the first toothed input wheel 42. To increase the axial compactness of the coupling system 6, the peripheral drum 431 is positioned at least partially protruding relative to the wheel disk 430, so that it forms a recess 432 in which certain components of the coupling system 6 can be fully or partially accommodated at least in the coupling position. The elastic return member 66, the kinematic link 67 and part of the push rod 670. together with the synchronizer 68 and the ring 620 bearing the second spline 62, are thus positioned in the recess 432 in all operating positions. The piston 651 enters the recess 432 in the coupling position.

It will also be noted that a recess 657 is formed in the support 650 to accommodate a bearing 501 for guiding the transmission shaft 5, which also contributes to the axial compactness of the system.

When the first gear ratio is engaged, the first clutch 1, which is normally open, is held closed by the application of a closing command, while the second clutch, which is normally open, is held open and the coupling system 6, which is normally open, is held closed by the application of pressure in the chamber 652. The transmission shaft 5 is driven by means of the first input shaft 41, the first toothed input wheel 42 and the first toothed output wheel 43 coupled to the wheel 610. The second toothed output wheel 53, however, also unnecessarily drives the second toothed input wheel 52 and the second input shaft 51. This state therefore consumes energy and is only intended for starting or low-speed driving phases.

The change from the first gear ratio to the second gear ratio is obtained by ceasing to supply energy to the closing command of the first clutch 1, applying a closing command to the second clutch 2 and ceasing to supply energy to the pressure supply command of the chamber 652. The first clutch 1 and the coupling system 6 then return by themselves to their stable position, namely the open position, and the second clutch moves to its closed position.

The torque transmission system then consumes little energy, as the first toothed output wheel 43, mounted idle on the transmission shaft 5, is not driven by it and does not unnecessarily drive the first input shaft 41.

According to one variant, the second clutch is normally closed and the first clutch is normally open. The torque transmission system is then further optimized in the second gear, as none of the commands is supplied with energy in this operating mode, which is the most usual.

In practice, a hydraulic interlock or an interlock by means of an electronic command is provided, between the first clutch 1 and the coupling system 6, to coordinate the opening and closing of the two components.

According to another embodiment, provision can be made for the second toothed output wheel 53 of the second transmission mechanism 12 to be provided with a coupling system similar to the coupling system 6.

As a variant, at least some of the gear trains can be replaced with belt drives. For greater gear reduction, at least some of the gear trains can include an intermediate wheel between the toothed input wheel and the toothed output wheel.

The engagement interfaces 61, 62, 64 have been described for convenience as splines, but they can each include one or more teeth and/or one or more longitudinal grooves or splines, parallel to the axis of revolution 100, to allow the sliding sleeve to slide.

The push rod 670 can be integrally formed with the piston 651.

The annular pad 672 can be made in one piece or made up of several rings stacked axially or superposed radially in coaxial layers. It can also be made up of several angular sectors, in order to facilitate mounting in the grooves 671 and 673.

It can also be envisioned that the grooves 671 and/or 673 be formed in the pad, and interact with corresponding radial ribs on the push rod 670 and/or the sliding sleeve 63.

According to another embodiment, the piston of the actuator is driven by a centrifugal mechanism. When a predetermined speed threshold is reached, the coupling system 6 is thus switched to interrupt drive.

According to another embodiment, the first clutch 1 can be omitted, and the coupling system 6 then forms the only coupling element between the first drive shaft 41 and the transmission shaft 5.

Figure 2:
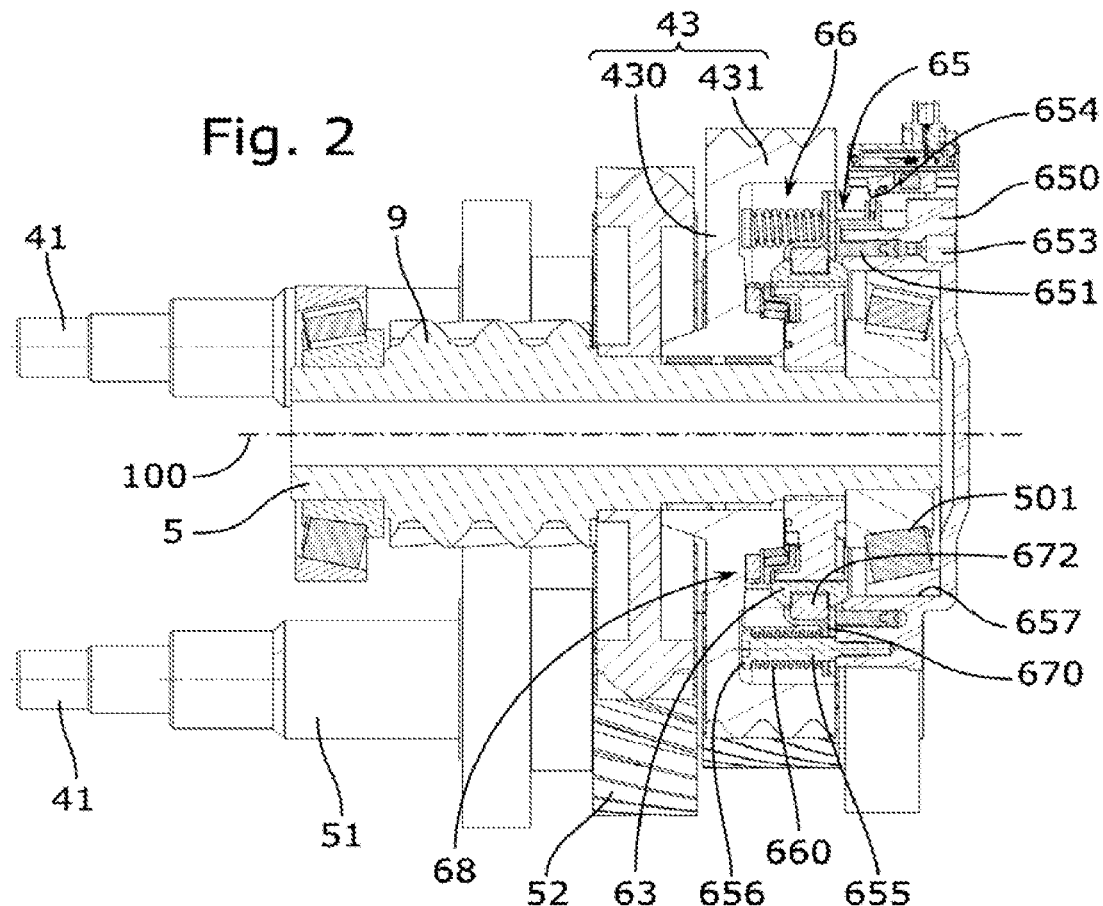
FIG. 2 is another cross-sectional view along the lines II in FIG. 4 of the torque transmission system in FIG. 1, in the retracted position of the coupling system.
Figure 4:
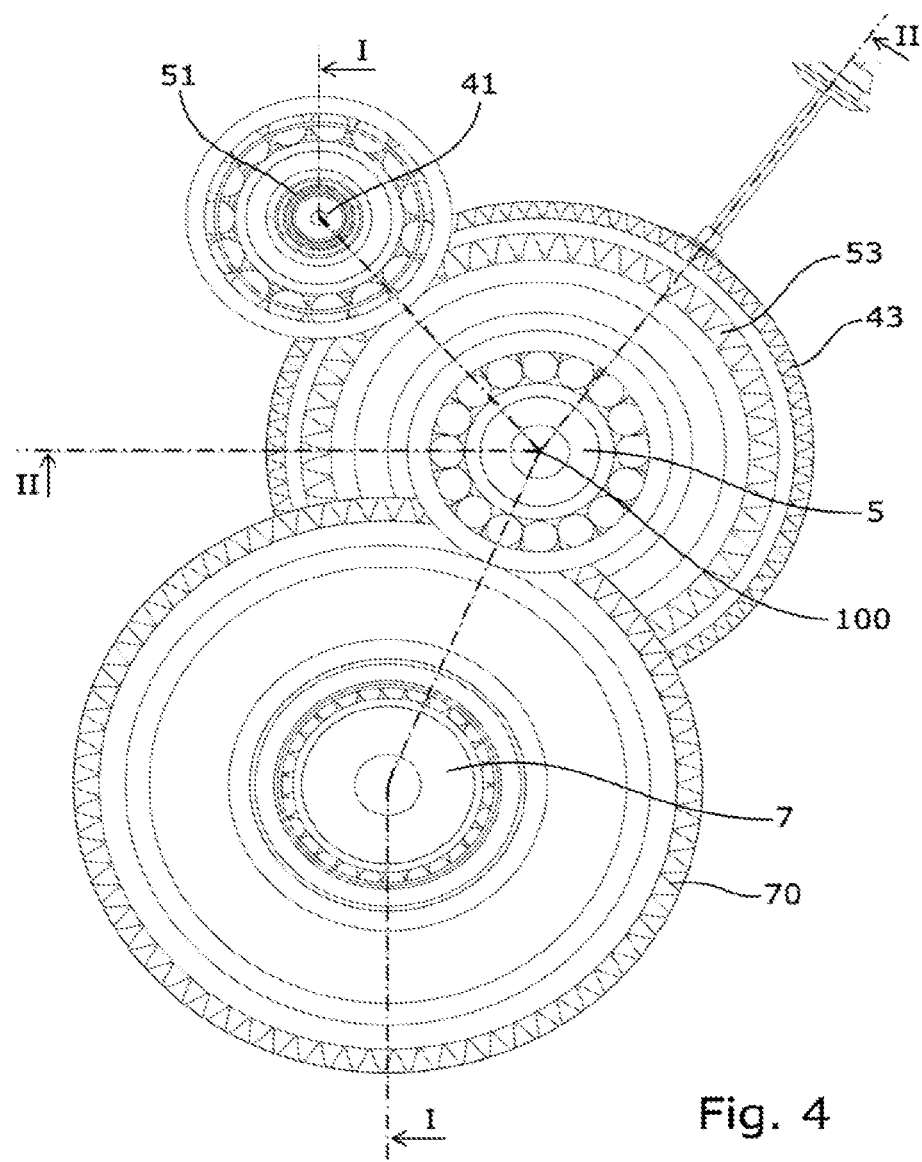
FIG. 4 is a front view of the torque transmission system in FIG. 1.
Figure 5:
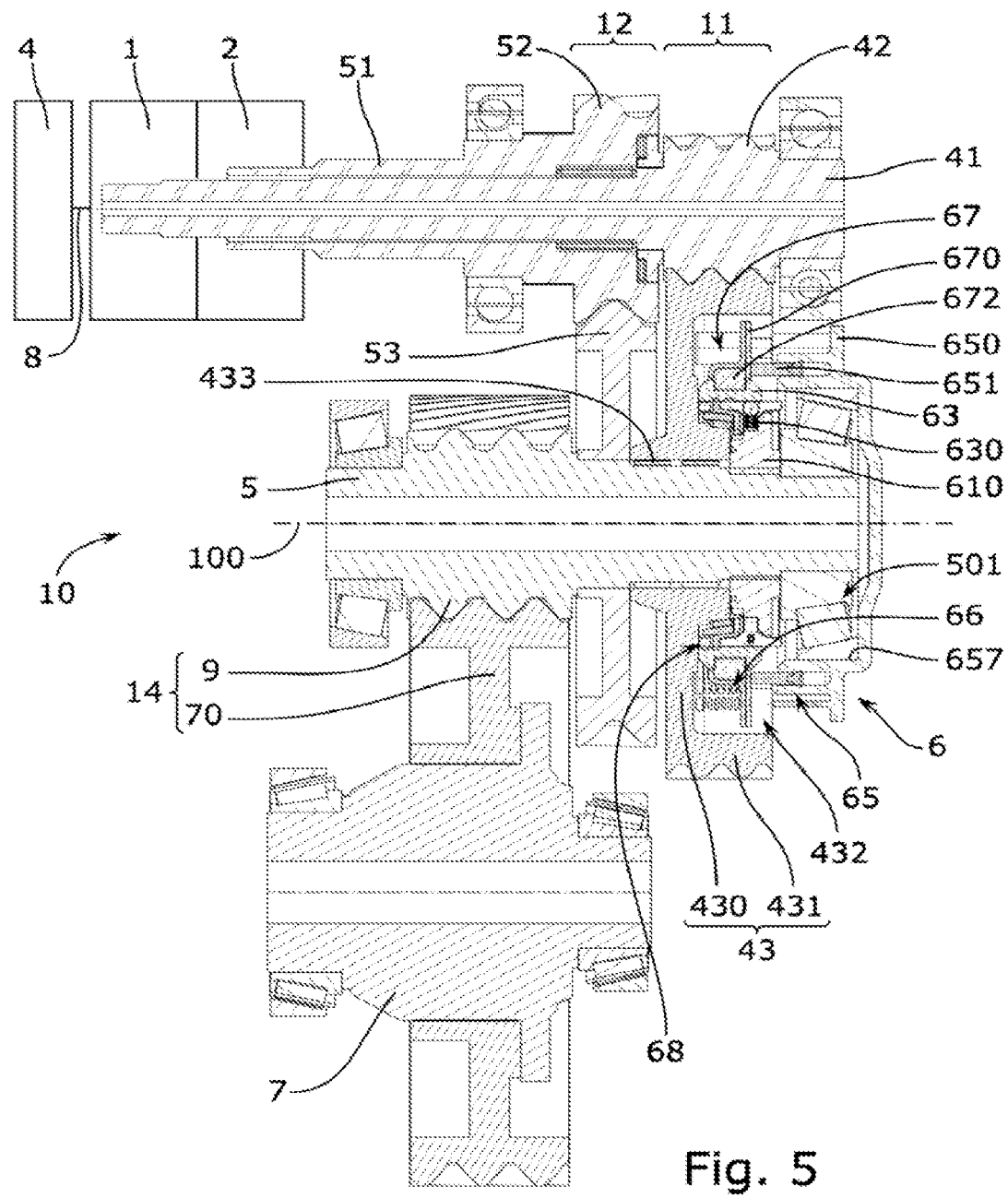
FIG. 5 is a cross-sectional view of the torque transmission system in FIG. 1, in a coupling position of the coupling system.
Figure 6:
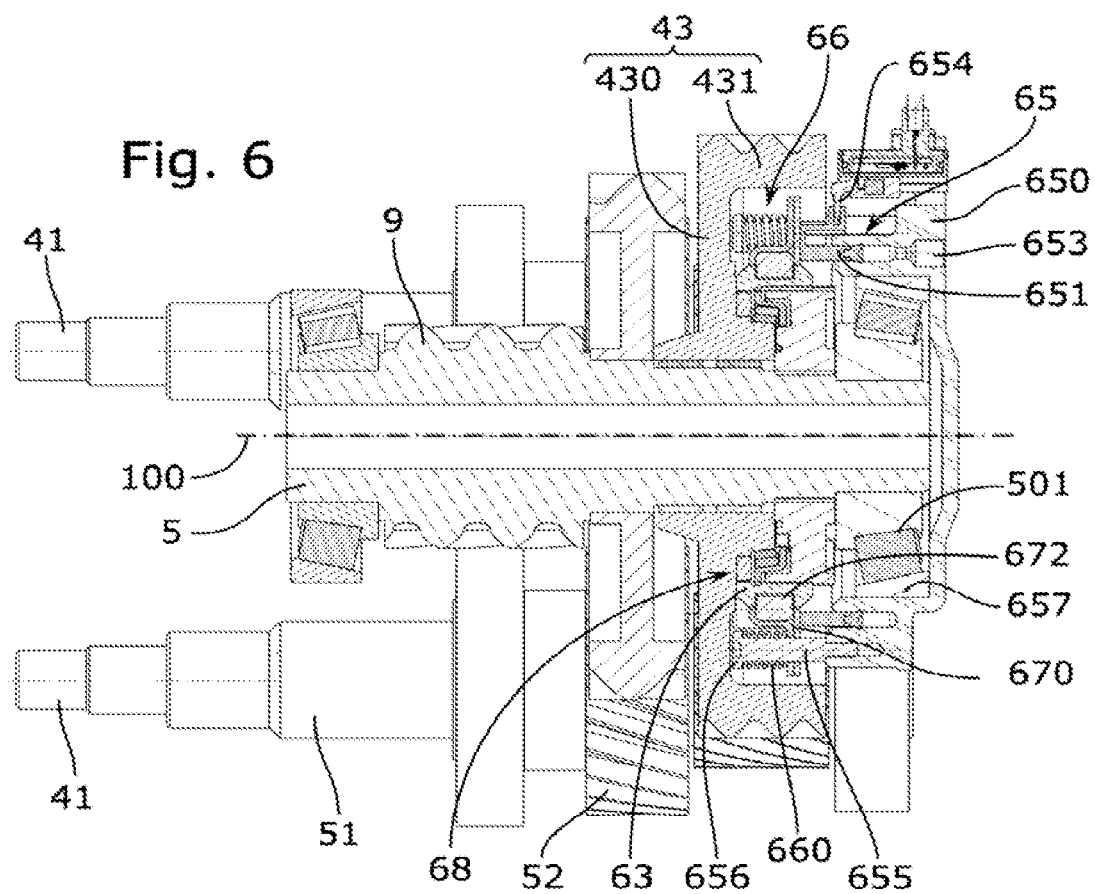
FIG. 6 is another cross-sectional view of the torque transmission system in FIG. 1, in the coupling position of the coupling system.

The coupling system according to the invention can be incorporated into other torque transmission devices, as illustrated for example in FIGS. 2 and 4 of application FR1901916.

The invention claimed is:

1. A coupling system comprising:
    a first engagement interface able to rotate about an axis of revolution in a fixed frame of reference, and a second engagement interface able to rotate about the axis of revolution in the fixed frame of reference and relative to the first engagement interface;
    a sliding sleeve including an intermediate engagement interface engaged with one of the first and second engagement interfaces, the sliding sleeve being capable of moving, by translation parallel to the axis of revolution, from a retracted position in which the intermediate engagement interface is not engaged with the other of the first and second engagement interfaces to a coupling position in which the intermediate engagement interface is engaged with one and the other of the first and second engagement interfaces and produces a rotational coupling between the first engagement interface and the second engagement interface;
    an actuator comprising a fixed support in the fixed frame of reference and a mobile member, the mobile member being movable in translation parallel to the axis of revolution between a rest position and an activated position; and a rotating kinematic link between the mobile member and the sliding sleeve, having a degree of freedom of rotation about the axis of revolution;

wherein the actuator comprises an elastic return member fixed in rotation about the axis of revolution in the fixed frame of reference, the mobile member being capable, by means of the kinematic link, of driving the sliding sleeve from the retracted position to the coupling position and of loading the elastic return member by passing from the rest position to the activated position, the elastic return member being able, while unloading, to return, by means of the kinematic link, the mobile member from the activated position to the rest position and the sliding sleeve from the coupling position to the retracted position, wherein one end of the elastic return member bears against a support secured to the fixed support, and wherein the fixed support comprises a body having a front face facing axially toward the second engagement interface, and rods project axially from this front face, each rod comprising a head on which the support is foiled, the elastic return member comprising springs gripped axially between the heads and the kinematic link.

2. The coupling system as claimed in claim 1, in which the mobile member is fixed in rotation about the axis of revolution in the fixed frame of reference.

3. The coupling system as claimed in claim 2, wherein one end of the elastic return member bears against a support secured to the fixed support.

4. The coupling system as claimed in claim 2, wherein the kinematic link comprises an intermediate push rod between the mobile member and the elastic return member.

5. The coupling system as claimed in claim 2, wherein the mobile member comprises an annular piston capable of sliding axially in a variable-volume annular chamber of the fixed support, connected to a hydraulic supply line.

6. The coupling system as claimed in claim 2, wherein the coupling system includes, interposed axially between the first engagement interface and the second engagement interface, a synchronizer including at least one synchronizing ring, the sliding sleeve in the retracted position not driving the synchronizing ring, the sliding sleeve being capable, when moving during an axial translation from the retracted position to the coupling position, of passing through an intermediate synchronizing position in which the intermediate engagement interface is engaged in a synchronizing engagement interface of the synchronizing ring and produces a rotational coupling between the first engagement interface and the synchronizing ring, the synchronizing ring being capable of rotating relative to the second engagement interface about the axis of revolution, generating, by friction, torque for driving the second engagement interface.

7. The coupling system as claimed in claim 1, wherein the kinematic link comprises an intermediate push rod between the mobile member and the elastic return member.

8. The coupling system as claimed in claim 7, wherein the push rod is fixed in rotation about the axis of revolution, bearing axially against the mobile member and against the elastic return member.

9. The coupling system as claimed in claim 8, wherein the push rod is linked to the sliding sleeve by a rotational guide or a pivot connection about the axis of revolution.

10. The coupling system as claimed in claim 7, wherein the push rod is linked to the sliding sleeve by a rotational guide or a pivot connection about the axis of revolution.

11. The coupling system as claimed in claim 10, wherein the rotational guide or the pivot connection comprises at least one annular pad, the annular pad being positioned at least partially between two opposite walls of the sliding sleeve.

12. The coupling system as claimed in claim 11, wherein the annular pad is positioned at least partially between two opposite walls of the push rod.

13. The coupling system as claimed in claim 1, wherein the kinematic link comprises an intermediate push rod between the mobile member and the elastic return member, and the push rod comprises a collar against which the springs bear, in which collar are formed openings, the rods passing through these openings so that the rods axially guide the push rod.

14. The coupling system as claimed in claim 1, wherein the mobile member comprises an annular piston capable of sliding axially in a variable-volume annular chamber of the fixed support, connected to a hydraulic supply line.

15. The coupling system as claimed in claim 1, wherein the coupling system includes, interposed axially between the first engagement interface and the second engagement interface, a synchronizer including at least one synchronizing ring, the sliding sleeve in the retracted position not driving the synchronizing ring, the sliding sleeve being capable, when moving during an axial translation from the retracted position to the coupling position, of passing through an intermediate synchronizing position in which the intermediate engagement interface is engaged in a synchronizing engagement interface of the synchronizing ring and produces a rotational coupling between the first engagement interface and the synchronizing ring, the synchronizing ring being capable of rotating relative to the second engagement interface about the axis of revolution, generating, by friction, torque for driving the second engagement interface.

16. The coupling system as claimed in claim 1, wherein the coupling system comprises:
a transmission shaft capable of rotating about the axis of revolution, the first engagement interface being secured to the transmission shaft, and
an idle transmission wheel capable of rotating relative to the transmission shaft about the axis of revolution, the second engagement interface being secured to the idle transmission wheel.

17. The coupling system as claimed in claim 1, wherein the kinematic link comprises an intermediate push rod between the mobile member and the elastic return member.

18. A torque transmission device for a motor vehicle comprising at least one motor, the transmission device comprising:
a first input element and a second input element,
a coupling system that includes:
a first engagement interface able to rotate about an axis of revolution in a fixed frame of reference, and a second engagement interface able to rotate about the axis of revolution in the fixed frame of reference and relative to the first engagement interface;
a sliding sleeve including an intermediate engagement interface engaged with one of the first and second engagement interfaces, the sliding sleeve being capable of moving, by translation parallel to the axis of revolution, from a retracted position in which the intermediate engagement interface is not engaged with the other of the first and second engagement interfaces to a coupling position in which the intermediate engagement interface is engaged with one and the other of the first and second engagement interfaces and produces a rotational coupling between the first engagement interface and the second engagement interface;

an actuator comprising a fixed support in the fixed frame of reference and a mobile member, the mobile member being movable in translation parallel to the axis of revolution between a rest position and an activated position;

a rotating kinematic link between the mobile member and the sliding sleeve, having a degree of freedom of rotation about the axis of revolution;

a transmission shaft capable of rotating about the axis of revolution, the first engagement interface being secured to the transmission shaft; and an idle transmission wheel capable of rotating relative to the transmission shaft about the axis of revolution, the second engagement interface being secured to the idle transmission wheel;

a first transmission mechanism, arranged to permanently transmit to the idle transmission wheel a rotational movement of the first input element, according to a first constant gear ratio, and a second transmission mechanism arranged to permanently transmit a rotational movement between the second input element and the transmission shaft, according to a second constant gear ratio different from the first gear ratio, wherein the actuator comprises an elastic return member fixed in rotation about the axis of revolution in the fixed frame of reference, the mobile member being capable, by means of the kinematic link, of driving the sliding sleeve from the retracted position to the coupling position and of loading the elastic return member by passing from the rest position to the activated position, the elastic return member being able, while unloading, to return, by means of the kinematic link, the mobile member from the activated position to the rest position and the sliding sleeve from the coupling position to the retracted position.

19. A coupling system comprising:

a first engagement interface able to rotate about an axis of revolution in a fixed frame of reference, and a second engagement interface able to rotate about the axis of revolution in the fixed frame of reference and relative to the first engagement interface;

a sliding sleeve including an intermediate engagement interface engaged with one of the first and second engagement interfaces, the sliding sleeve being capable of moving, by translation parallel to the axis of revolution, from a retracted position in which the intermediate engagement interface is not engaged with the other of the first and second engagement interfaces to a coupling position in which the intermediate engagement interface is engaged with one and the other of the first and second engagement interfaces and produces a rotational coupling between the first engagement interface and the second engagement interface;

an actuator comprising a fixed support in the fixed frame of reference and a mobile member, the mobile member being movable in translation parallel to the axis of revolution between a rest position and an activated position; and a rotating kinematic link between the mobile member and the sliding sleeve, having a degree of freedom of rotation about the axis of revolution;

wherein the actuator comprises an elastic return member fixed in rotation about the axis of revolution in the fixed frame of reference, the mobile member being capable, by means of the kinematic link, of driving the sliding sleeve from the retracted position to the coupling position and of loading the elastic return member by passing from the rest position to the activated position, the elastic return member being able, while unloading, to return, by means of the kinematic link, the mobile member from the activated position to the rest position and the sliding sleeve from the coupling position to the retracted position, wherein the kinematic link comprises an intermediate push rod between the mobile member and the elastic return member, and wherein the push rod is fixed in rotation about the axis of revolution, bearing axially against the mobile member and against the elastic return member.

* * * * *